(12) United States Patent
McCloud (10) Patent No.: US 7,108,315 B1
(45) Date of Patent: Sep. 19, 2006

(54) SUPPORT FRAME FOR CONTAINER TRAILER

(75) Inventor: Travis S. McCloud, Athens, TN (US)

(73) Assignee: Delaware Capital Formation, Inc., Wilmington, DE (US)

(*) Notice: Subject to any disclaimer, the term of this patent is extended or adjusted under 35 U.S.C. 154(b) by 6 days.

(21) Appl. No.: 10/964,370

(22) Filed: Oct. 13, 2004

Related U.S. Application Data (60) Provisional application No. 60/510,529, filed on Oct. 14, 2003.

(51) Int. Cl.
*B62D 21/03* (2006.01)
*B62D 21/12* (2006.01)

(52) U.S. Cl. .................. 296/184.1; 280/785; 280/839; 280/107; 293/155

(58) Field of Classification Search ............. 296/182.1, 296/183.1, 184.1, 204; 280/785, 838, 839, 280/107; 293/155
See application file for complete search history.

(56) References Cited

U.S. PATENT DOCUMENTS

| | | | | |
|---|---|---|---|---|
| 2,275,349 A | * | 3/1942 | Collender | ............... 296/182.1 |
| 2,996,790 A | | 8/1961 | Trafford | |
| 4,270,334 A | * | 6/1981 | Bender | .................. 52/801.11 |
| 4,273,369 A | * | 6/1981 | Rosenbaum | .................. 293/1 |
| 4,365,736 A | | 12/1982 | Stumm | |
| 4,513,064 A | | 4/1985 | Marcus | |
| 4,534,589 A | * | 8/1985 | Booher | ................... 296/184.1 |
| 4,548,132 A | | 10/1985 | Moon | |
| 5,221,585 A | | 6/1993 | Kresse, Jr. et al. | |
| 5,417,453 A | * | 5/1995 | VanDenberg | ............... 280/785 |
| 5,532,451 A | | 7/1996 | La Rocca | |
| 5,588,693 A | | 12/1996 | Higginson et al. | |
| 5,878,940 A | | 3/1999 | Rosenbalm | |
| 6,034,347 A | | 3/2000 | Alber et al. | |
| 6,109,684 A | * | 8/2000 | Reitnouer | ................. 296/184.1 |
| 6,128,815 A | | 10/2000 | Jurica et al. | |
| 6,131,286 A | | 10/2000 | Kelly et al. | |
| 6,276,592 B1 | | 8/2001 | Jochmann et al. | |
| 6,301,763 B1 | | 10/2001 | Pryor | |
| 6,327,514 B1 | | 12/2001 | Hazama et al. | |
| 6,394,007 B1 | | 5/2002 | Lewis et al. | |
| 6,546,693 B1 | * | 4/2003 | Wycech | ...................... 52/790.1 |
| 6,643,908 B1 | | 11/2003 | Lyons | |
| 6,854,789 B1 | * | 2/2005 | Kloepfer | .................. 296/183.2 |
| 2001/0016805 A1 | | 8/2001 | Gupta et al. | |
| 2001/0043834 A1 | | 11/2001 | Mullen | |

FOREIGN PATENT DOCUMENTS

| | | | | |
|---|---|---|---|---|
| JP | 53007035 A | | 1/1978 | |
| JP | 0031874 | * | 3/1981 | ................. 296/204 |
| JP | 0204870 | | 8/1989 | |
| NL | 7700-221 | * | 7/1978 | ................. 296/204 |

* cited by examiner

*Primary Examiner*—Dennis H. Pedder
(74) *Attorney, Agent, or Firm*—Chambliss, Bahner & Stophel, P.C.

(57) ABSTRACT

A frame assembly for a container trailer includes a longitudinal component having a plurality of locating constructions. The frame assembly also includes a plurality of cross-members, each of which includes a locating construction for mating with a locating construction of the longitudinal component. The locating constructions of the cross-members and the locating constructions of the longitudinal component are located, sized and arranged so that a locating construction of each cross-member may be mated with a locating construction of the longitudinal component to position the cross-members with respect to the longitudinal component.

17 Claims, 5 Drawing Sheets

SUPPORT FRAME FOR CONTAINER TRAILER

CROSS REFERENCE TO RELATED APPLICATION

This application claims the benefit of U.S. Provisional Application No. 60/510,529, which was filed on Oct. 14, 2003.

FIELD OF THE INVENTION

This invention relates generally to the fabrication and assembly of the support frame for a vehicle having a container mounted thereon, such as a tank trailer or bulk trailer. More particularly, the invention relates to a frame assembly comprised of components that are assembled by means of mating locating constructions such as slots and tabs, and a method for constructing such a frame assembly. In a preferred embodiment, the invention comprises a suspension frame assembly for a container trailer.

BACKGROUND AND DESCRIPTION OF THE PRIOR ART

The conventional support frame for a container trailer includes both a base frame which supports the container and a suspension frame which includes the wheel/axle assembly and the suspension system. Typically, the base frame and the suspension frame are separately fabricated and welded or bolted together prior to mounting of the container thereon. In at least a part of one or both of the fabrication phases, various sheet metal components are cut from sheets of metal, and they may be bent or otherwise fabricated into particular shapes or configurations. In the assembly phase, these components are located and fixed with respect to each other using assembly fixtures, and they are welded or otherwise joined to form the frame component. Then the base frame and the suspension frame are joined together and a container is mounted thereon. The techniques conventionally employed in the assembly phase rely heavily on a vast array of fixtures that are used to locate the individual frame components prior to being welded. These fixtures range in complexity from small tabletop welding jigs with simple locators to very complex electronically controlled motor driven units capable of holding large assemblies or subassemblies in place for welding. These fixtures cost many thousands of dollars to design and manufacture and also require ongoing maintenance to insure that they remain accurate and consistent with product improvement and other design changes. In addition, the locating of components with respect to each other by fixturing often results in errors in fit and weld integrity between the components. When fixturing is used to locate components with respect to each other, most of the welds required for the assembly of a frame structure must be made by human rather than robot welders. Furthermore, in an attempt to correct errors in fit between the components, large welds are often made to fill in the gaps between components. Such large welds may contribute increased weight and may cause heat distortion in the finished product. In addition, the fixtures for a new product require time to design and build. When a new prototype for a product is to be made, it is often necessary to build the fixtures for the design by hand. This process is slow, labor-intensive and expensive.

In recent years, there have been a number of developments aimed at improving the conventional manufacturing process. For example, flexible manufacturing systems and modular fixturing systems have been developed to handle an increase in product variations, especially as relates to custom fabricated products or the production of several products on a single production line. However, these systems have not attempted to reduce the extent to which fixturing is required in the manufacture of frames for container trailers.

It would be desirable if a manufacturing method and frame design for a trailer having a container mounted thereon could be devised that would reduce or minimize the number and complexity of the fixtures required for assembly. It would also be desirable if such a method and frame design could be devised that would reduce or minimize the risk of human error in the assembly process. It would also be desirable if such a method and frame design could be provided that would provide for more accurate fit of the various components, thus reducing the size of the welds required and reducing the effects of heat distortion due to such welds. It would also be desirable if such a method and frame design could be developed that would require fewer and less complex components than conventional designs.

ADVANTAGES OF THE INVENTION

Among the advantages of the invention is that it permits the assembly of a frame for a trailer having a container mounted thereon utilizing fewer and/or less complex fixtures than are required by conventional methods and frame designs. Another advantage of the invention is that it provides for manufacture of a frame for a container trailer more quickly and with more accurate fit than is obtained by conventional methods and frame designs. Still another advantage of the invention is that it is susceptible to a larger number of welds being provided by robot welders than in conventional methods and designs. Another advantage of the invention is that the components of a frame assembly are formed in such a way as to guide the assemblers in the correct sequence of assembly. The components thus aid the assemblers in the assembly phase and reduce the need for complex assembly drawings and/or assembly tooling. Still another advantage of the invention is that it reduces the number and complexity of components for a frame assembly for a container trailer.

Additional advantages of this invention will become apparent from an examination of the drawings and the ensuing description.

EXPLANATION OF TECHNICAL TERMS

As used herein, the term "container trailer" and similar terms refer to a trailer which is adapted to haul liquids or other materials and which is adapted to be pulled by a tractor.

As used herein, the term "container" refers to a tank for liquids or an enclosure for particulates or other materials that may be mounted on a trailer and pulled by a tractor.

As used herein, the term "frame assembly" and similar terms refer to the structural frame that supports all or a portion of the container of a trailer and which may carry the axles and suspension system of the trailer.

As used herein, the term "locating construction" refers to a slot, hole, tab, leg, shoulder, lip or other feature of a component that may be mated with a locating construction of another component and thereby used to position or locate one component with respect to another.

As used herein, the term "mated" and similar terms refers to the union, connection, linking or interlocking of a locating construction of a component with a locating construction of another component, which union, connection, linking or interlocking is achieved without fixtures or fasteners.

SUMMARY OF THE INVENTION

The invention comprises a frame assembly and a method of manufacture of a frame assembly for a container trailer. The frame assembly includes a plurality of components that are provided with locating constructions which locate the components with respect to each other for welding or other fastening operations. Preferably, the locating constructions are configured and arranged so that components that are not interchangeable can only be located with respect to the other components in one way. According to the method of the invention, a frame assembly is constructed from a plurality of components which are located and arranged with respect to each other by means of locating constructions and welded or otherwise joined together. In a preferred embodiment of the method, a plurality of container support components having locating constructions are attached to the container and the container is placed on the frame assembly so that the locating constructions for the container support components are mated with corresponding locating constructions on the assembly.

In order to facilitate an understanding of the invention, the preferred embodiments of the invention are illustrated in the drawings, and a detailed description thereof follows. It is not intended, however, that the invention be limited to the particular embodiments described or to use in connection with the apparatus illustrated herein. Various modifications and alternative embodiments such as would ordinarily occur to one skilled in the art to which the invention relates are also contemplated and included within the scope of the invention described and claimed herein.

BRIEF DESCRIPTION OF THE DRAWINGS

The presently preferred embodiments of the invention are illustrated in the accompanying drawings, in which like reference numerals represent like parts throughout, and in which.

DESCRIPTION OF THE PREFERRED EMBODIMENTS OF THE INVENTION

Container trailers typically comprise a container and a frame having a suspension assembly which usually includes the wheels and axles, air tanks for supplying air for the trailer, and springs or air bags to cushion the ride. In the manufacture and assembly of a container trailer, it is common to fabricate the container separately from the frame. It is also common to fabricate the frame in two components. Generally, a base frame is fabricated and the container mounted thereon. A suspension frame is also fabricated and the base frame/container combination is mounted on the suspension frame to form the frame assembly.

Figure 1:
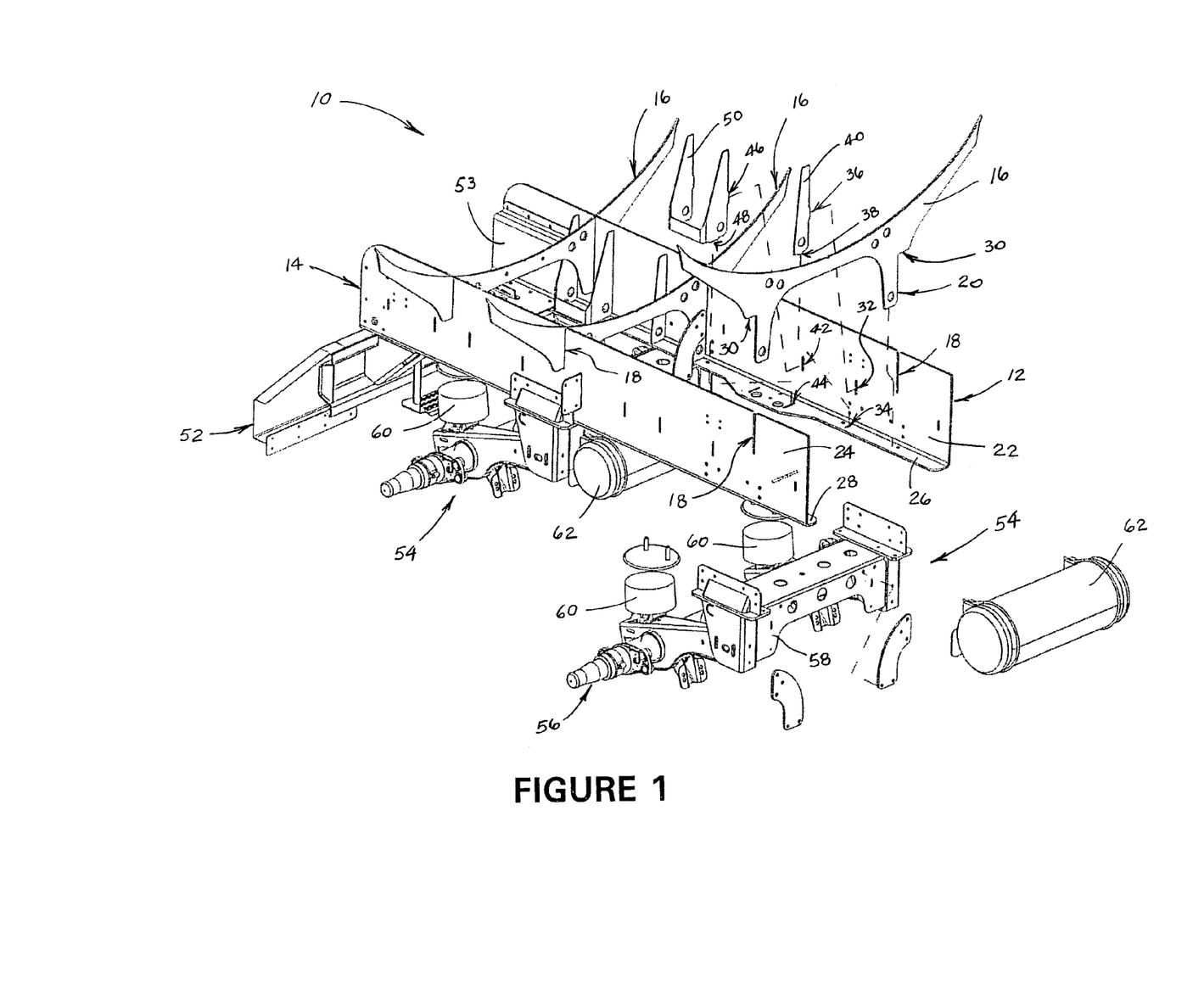
FIG. 1 is an exploded front perspective view of a preferred frame assembly of a container trailer that is designed and constructed according to the invention.
Figure 2:
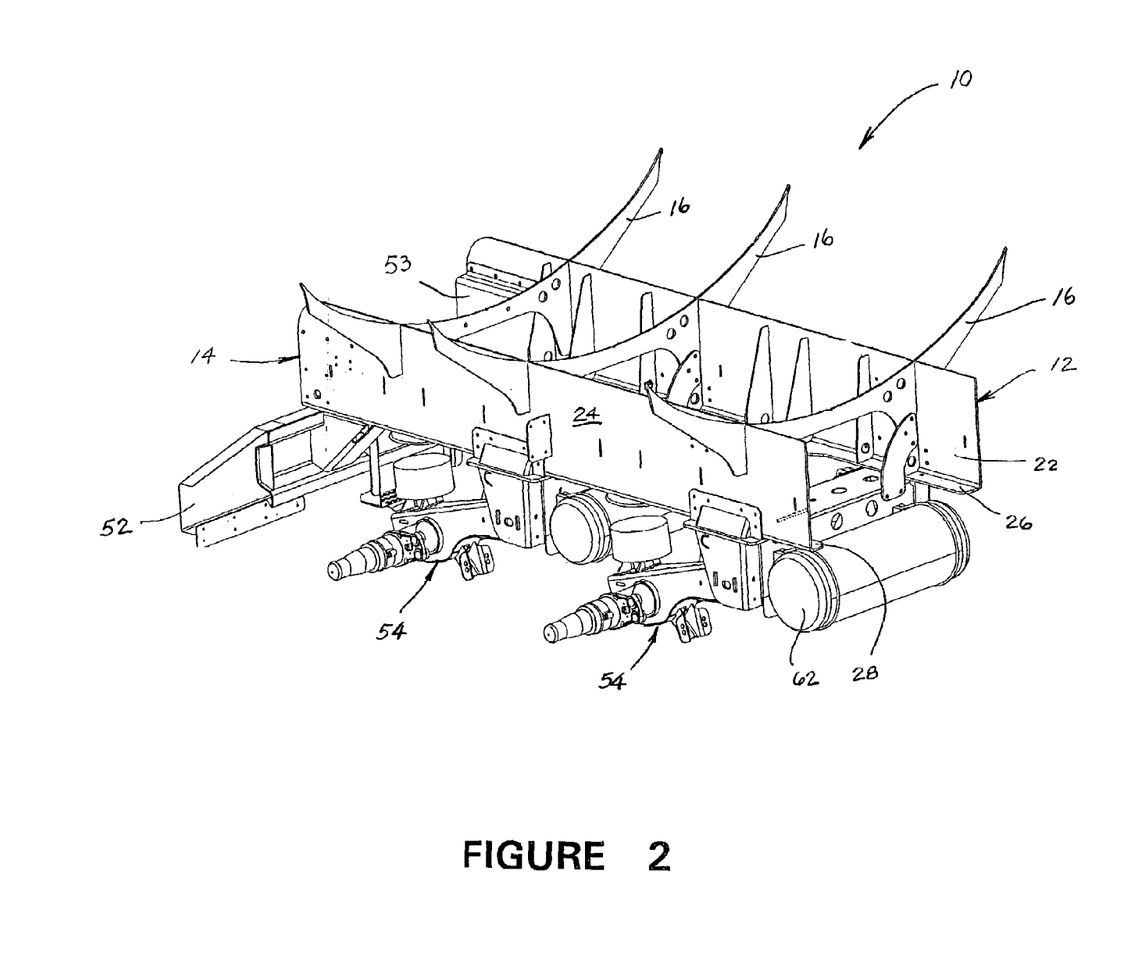
FIG. 2 is a front perspective view of the frame assembly of FIG. 1.
Figure 3:
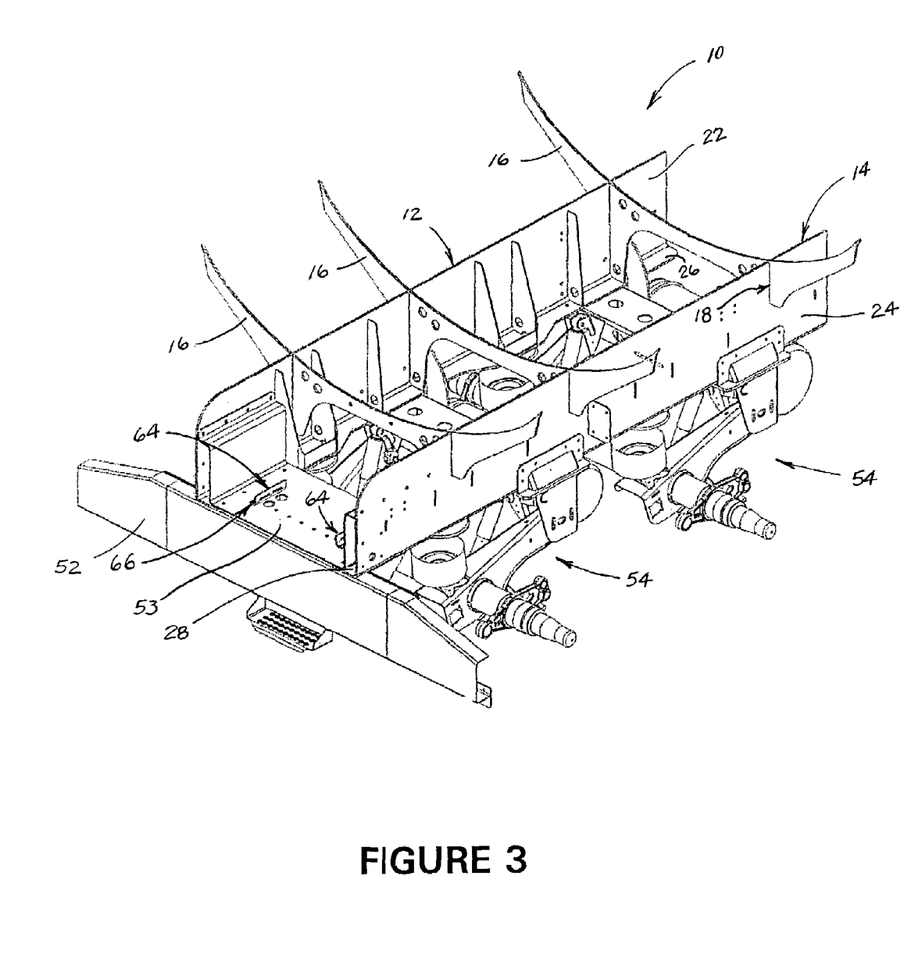
FIG. 3 is a rear perspective view of the frame assembly of FIGS. 1 and 2.
Figure 4:
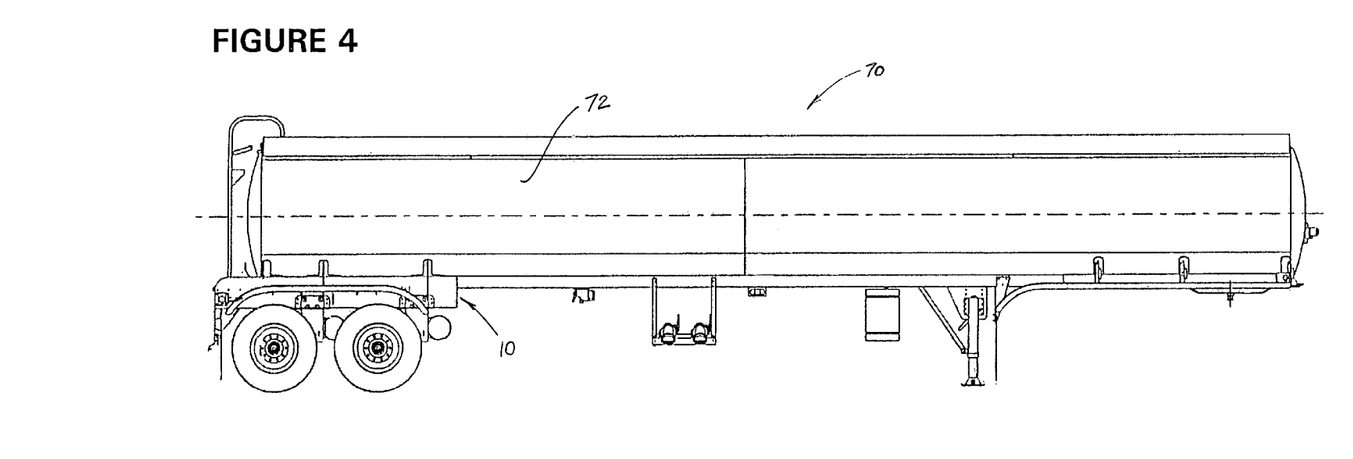
FIG. 4 is a side view of a preferred container trailer which includes a frame assembly such as is illustrated in FIGS. 1–3.
Figure 5:
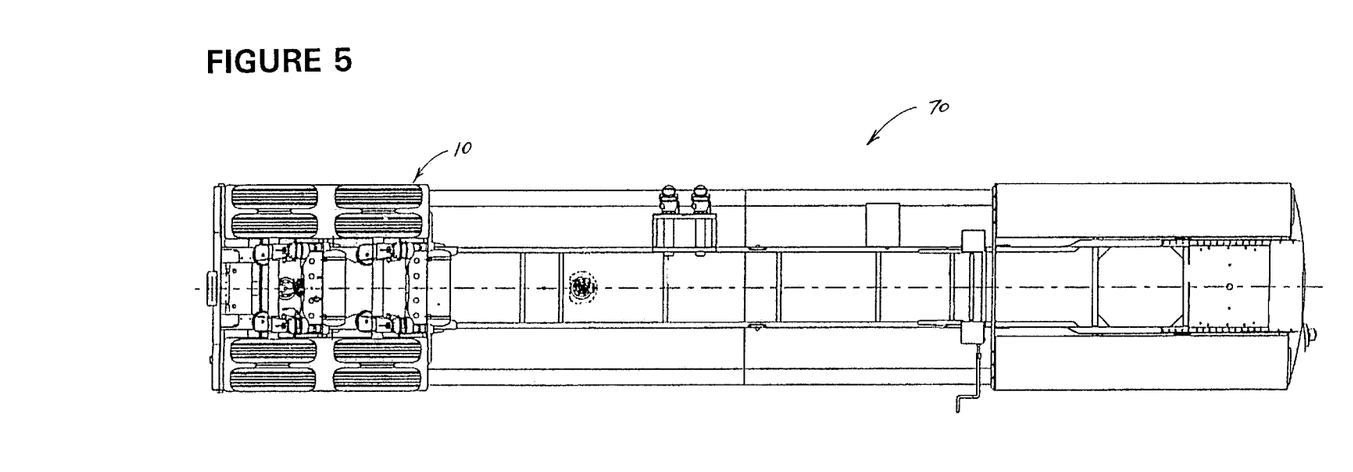
FIG. 5 is a bottom view of the container trailer of FIG. 4.
Figure 6:
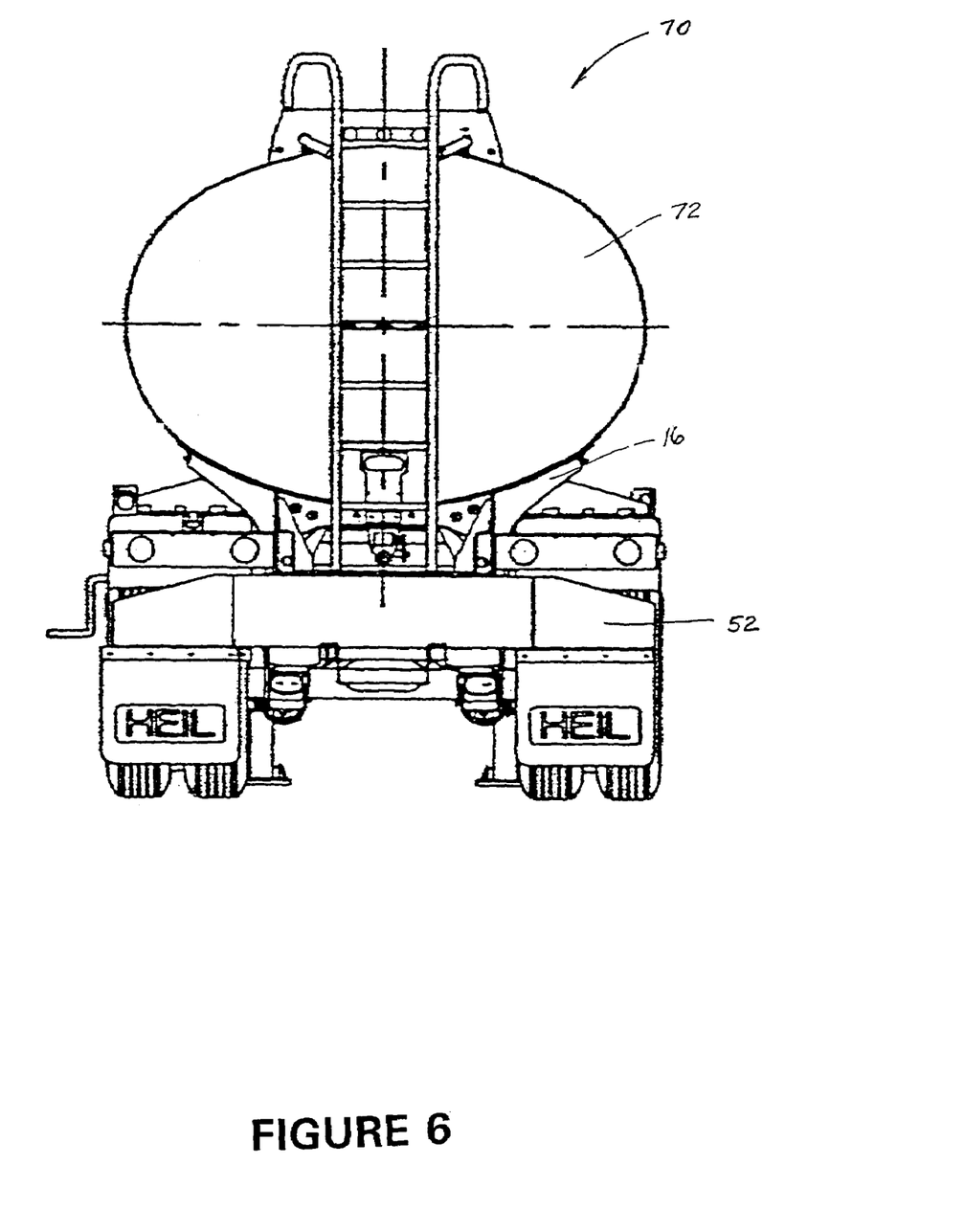
FIG. 6 is a rear view of the container trailer of FIGS. 4 and 5.

FIGS. 1–3 illustrate a frame assembly for a container trailer according to a preferred embodiment of the invention, and FIGS. 4–6 illustrate a container trailer which includes the preferred frame assembly of FIGS. 1–3. As shown in FIGS. 1–3, preferred assembly 10 includes a pair of longitudinal components 12 and 14, and three identical cross-members or saddles 16. Longitudinal components 12 and 14 are each provided with locating constructions, preferably in the form of slots 18 which are sized and arranged so as to receive the cross-members. Furthermore, preferred cross-members 16 are all provided with locating constructions in the form of legs 20, which bear against the inside of sides 22 and 24 and the upper surfaces of bottom lips 26 and 28 of longitudinal members 12 and 14 respectively, and shoulders 30 (best shown in FIG. 1), which bear against the bottom of slots 18. The cooperation of slots 18 and sides 22 and 24 of longitudinal members 12 and 14, and legs 20 and shoulders 30 of cross-members 16 insures that the cross-members can only fit together with the longitudinal members in one way, namely the way shown in FIGS. 1–3.

As shown in FIG. 1, longitudinal member 12 also includes slots 32 and 34 which are uniquely located and arranged to receive tabs 36 and 38 respectively of structural support 40, and slots 42 and 44 which are uniquely located and arranged to receive tabs 46 and 48 respectively of structural support 50. Other structural supports are mounted to member 12 in similar fashion. In addition, slots are provided in longitudinal member 14 for use in mounting structural members similar to members 40 and 50, as well as other structural members.

Preferably, longitudinal components 12 and 14, and cross-members 16 are fabricated from sheet metal such as aluminum or steel. Slots are then cut into the longitudinal components for mounting of the cross-members and other components thereon. It should be appreciated that the components to be assembled according to the invention need not all be cut from sheet metal, and that other locating constructions that permit the components to be uniquely located with respect to each other could also be employed. The construction of assembly 10 according to the invention eliminates the necessity for extensive (and expensive) fixturing in the assembly of the frame components for the container trailer.

Preferred suspension frame assembly 10 also includes rear bumper assembly 52 and a pair of axle assemblies 54. As best shown in FIG. 1, each axle assembly includes axle 56, axle support frame 58 and a pair of suspension air bags 60. Air tank 62 is preferably mounted to each axle assembly for supply of air to the trailer.

FIGS. 4–6 illustrate a container trailer which is equipped with preferred frame assembly 10. As shown therein, container trailer 70 includes container 72 which is mounted on the frame assembly. Preferably, container trailer 70 is assembled by constructing the container in a conventional manner, and welding cross-members 16 onto the lower side thereof. The cross-members are then inserted into the appropriate slots of the longitudinal members of the frame assembly so as to mate the cross-members thereto, and the longitudinal members are secured to the cross-members and the container, preferably by tack-welding. U-shaped shear plate 53 (shown in FIG. 1) is then bolted or otherwise attached between longitudinal members 12 and 14. The attachment of shear plate 53 provides structural support for the assembly and assists in fixturing the assembly for attachment of subsequent components during the assembly process. After attachment of the shear plate, other support components such as supports 40 and 50 are located with respect to the longitudinal members and welded into place. Then, the container is turned over and bumper assembly 52 and axle assemblies 54 are bolted or otherwise attached to the shear plate and/or to the longitudinal members. As best shown in FIG. 3, bumper assembly 52 is preferably provided with a pair of tabs 64 that are adapted to mate with slots 66 in shear plate 53.

Of course, the invention also contemplates other sequences of construction. For example, assembly 10 may be assembled by inserting the cross-members into the appropriate slots in longitudinal members 12 and 14, and attaching shear plate, 53, bumper 52, supports 40 and 50, and axle assemblies 54. Then the container may be lowered into place onto assembly 10 and welded thereto. In another method, the cross-members may be attached to the container and a subassembly comprising the longitudinal members, shear plate, bumper supports 40 and 50 and axle assemblies 54 may be constructed. Then, the container with cross-members 16 attached may be lowered into place so that the cross-members mate with the longitudinal members as has been described herein. The cross-members may then be welded into place with respect to (or otherwise attached to) the longitudinal members. The invention thus provides a simplified construction for a container trailer utilizing fewer and/or less complex fixtures than are required by conventional methods and frame designs. The invention also permits the manufacture of the frame for a container trailer to be carried out more quickly and with more accurate fit and fewer components than is required by conventional methods and frame designs.

Although this description contains many specifics, these should not be construed as limiting the scope of the invention but as merely providing illustrations of some of the presently preferred embodiments thereof, as well as the best mode contemplated by the inventor of carrying out the invention. The invention, as described herein, is susceptible to various modifications and adaptations as would be understood by those having ordinary skill in the art to which the invention relates, and the same are intended to be comprehended within the meaning and range of equivalents of the appended claims.

What is claimed is:

1. A frame assembly for a container trailer, comprising:
    (a) a first longitudinal frame component which includes:
        (i) a side portion having a slot located therein, which slot includes a slot bottom;
        (ii) a bottom lip depending from the side portion;
    (b) a second longitudinal frame component which includes:
        (i) a side portion having a slot located therein, which slot includes a slot bottom;
        (ii) a bottom lip depending from the side portion;
    (c) a cross-member which:
        (i) is adapted to support a lower surface of a container;
        (ii) is adapted to fit within the slot in the side portion of the first longitudinal frame component and within the slot in the side portion of the second longitudinal frame component;
        (iii) has a first depending leg that is adapted to be supported by the bottom lip of the first longitudinal frame component when the cross-member is located within the slot in the side portion of the first longitudinal frame component;
        (iv) has a second depending leg that is adapted to be supported by the bottom lip of the second longitudinal frame component when the cross-member is located within the slot in the side portion of the second longitudinal frame component.

2. The frame assembly of claim 1 wherein the first and second longitudinal frame components being arranged so that:
    (a) the side portion of the first longitudinal frame component is generally parallel to the side portion of the second longitudinal frame component;
    (b) the bottom lip of the first longitudinal frame component is generally located in the same plane as the bottom lip of the second longitudinal frame component.

3. The frame assembly of claim 1 wherein the cross member has:
    (a) a first shoulder that is adapted to bear against the slot bottom in the side portion of the first longitudinal frame component when:
        (i) the cross-member is located within the slot in said side portion; and
        (ii) the first depending leg is supported by the bottom lip of the first longitudinal frame component; and
        (iii) the second depending leg is supported by the bottom lip of the second longitudinal frame component;
    (b) a second shoulder that is adapted to bear against the slot bottom in the side portion of the second longitudinal frame component when:
        (i) the cross-member is located within the slot in said side portion; and
        (ii) the first depending leg is supported by the bottom lip of the first longitudinal frame component; and
        (iii) the second depending leg is supported by the bottom lip of the second longitudinal frame component.

4. The frame assembly of claim 1 wherein the cross member has an upper profile that is adapted to conform to the shape of a portion of the lower surface of the container.

5. The frame assembly of claim 1 comprising:
    (a) a shear plate that is adapted to be attached between the first and second longitudinal frame components, said shear plate including a locating construction;
    (b) a bumper assembly which includes a locating construction that is located, sized and arranged so as to mate with the locating construction of the shear plate.

6. The frame assembly of claim 1 which includes a pair of axle assemblies that are attached to the first and second longitudinal frame components.

7. The frame assembly of claim 1:
    (a) wherein the first longitudinal frame component includes a support locating construction that is different from the slot for the cross-member;
    (b) wherein the frame assembly includes a first structural support that is different from the cross-member, said first structural support including a locating construction for mating with the support locating construction of the first longitudinal frame component;
    wherein the locating construction of the first structural support and the support locating construction of the first longitudinal frame component are located, sized and arranged so that the locating construction of the first structural support may be mated with the support locating construction of the first longitudinal frame component to position the first structural support with respect to the first longitudinal frame component.

8. The frame assembly of claim 7:
(a) wherein the second longitudinal frame component includes a support locating construction that is different from the slot for the cross-member;
(b) wherein the frame assembly includes a second structural support that is different from the cross-member, said second structural support including a locating construction for mating with the support locating construction of the second longitudinal frame component;
wherein the locating construction of the second structural support and the support locating construction of the second longitudinal frame component are located, sized and arranged so that the locating construction of the second structural support may be mated with the support locating construction of the second longitudinal frame component to position the second structural support with respect to the second longitudinal frame component.

9. A frame assembly for a container trailer, comprising:
(a) a first longitudinal frame component which includes:
  (i) a side portion;
  (ii) a bottom lip depending from the side portion;
  (iii) a first slot located in the side portion, said first slot including a first slot bottom;
  (iv) a second slot located in the side portion and spaced from the first slot, said second slot including a second slot bottom;
(b) a second longitudinal frame component which includes:
  (i) a side portion;
  (ii) a bottom lip depending from the side portion;
  (iii) a first slot located in the side portion, said first slot including a first slot bottom;
  (iv) a second slot located in the side portion and spaced from the first slot, said second slot including a second slot bottom;
said first and second longitudinal frame components being arranged so that their side portions are generally parallel to each other;
(c) a first cross-member which:
  (i) is adapted to support a lower surface of a container;
  (ii) is adapted to fit within the first slot in the side portion of the first longitudinal frame component and within the first slot in the side portion of the second longitudinal frame component;
  (iii) has a first depending leg that is adapted to be supported by the bottom lip of the first longitudinal frame component when the first cross-member is located within the first slot in the side portion of the first longitudinal frame component;
  (iv) has a second depending leg that is adapted to be supported by the bottom lip of the second longitudinal frame component when the first cross-member is located within the first slot in the side portion of the second longitudinal frame component;
  (v) has a first shoulder that is adapted to bear against the first slot bottom in the side portion of the first longitudinal frame component when the first cross-member is located within the first slot in said side portion;
  (vi) has a second shoulder that is adapted to bear against the first slot bottom in the side portion of the second longitudinal frame component when the first cross-member is located within the first slot in said side portion;
(d) a second cross-member which:
  (i) is adapted to support a lower surface of a container;
  (ii) is adapted to fit within the second slot in the side portion of the first longitudinal frame component and within the second slot in the side portion of the second longitudinal frame component;
  (iii) has a first depending leg that is adapted to be supported by the bottom lip of the first longitudinal frame component when the second cross-member is located within the second slot in the side portion of the first longitudinal frame component;
  (iv) has a second depending leg that is adapted to be supported by the bottom lip of the second longitudinal frame component when the second cross-member is located within the second slot in the side portion of the second longitudinal frame component;
  (v) has a first shoulder that is adapted to bear against the second slot bottom in the side portion of the first longitudinal frame component when the second cross-member is located within the second slot in said side portion;
  (vi) has a second shoulder that is adapted to bear against the second slot bottom in the side portion of the second longitudinal frame component when the second cross-member is located within the second slot in said side portion.

10. The frame assembly of claim 9 wherein the first and second longitudinal frame components are arranged so that the bottom lip of the first longitudinal frame component is located in the same plane as the bottom lip of the second longitudinal frame component.

11. The frame assembly of claim 9 wherein the first cross-member is interchangeable with the second cross-member.

12. A method for constructing a container trailer which comprises:
(a) providing a container;
(b) fabricating a first longitudinal frame component from sheet metal, said first longitudinal frame component comprising:
  (i) a side portion having a slot located therein, which slot includes a slot bottom;
  (ii) a bottom lip depending from the side portion;
(c) fabricating a second longitudinal frame component from sheet metal, said second longitudinal frame component comprising:
  (i) a side portion having a slot located therein, which slot includes a slot bottom;
  (ii) a bottom lip depending from the side portion;
(d) arranging said first and second longitudinal frame components so that their side portions are generally parallel to each other;
(e) fabricating a cross-member from sheet metal, said cross-member:
  (i) being adapted to support a lower surface of a container;
  (ii) being adapted to fit within the slot in the side portion of the first longitudinal frame component and within the slot in the side portion of the second longitudinal frame component;
  (iii) having a first depending leg that is adapted to be supported by the bottom lip of the first longitudinal frame component when the cross-member is located within the slot in the side portion of the first longitudinal frame component;
  (iv) having a second depending leg that is adapted to be supported by the bottom lip of the second longitudinal frame component when the cross-member is located within the slot in the side portion of the second longitudinal frame component;
(f) attaching the cross-member to the container;
(g) fitting the cross member within the slot in the side portion of the first longitudinal frame component and within the slot in the side portion of the second longitudinal frame component, so that:
  (i) the first depending leg is supported by the bottom lip of the first longitudinal frame component;
  (ii) the second depending leg is supported by the bottom lip of the second longitudinal frame component;
(h) securing the cross-member to the first and second longitudinal frame components.

13. The method of claim 12 which includes the following steps:
(a) having a first shoulder that is adapted to bear against the slot bottom in the side portion of the first longitudinal frame component when the cross-member is located within the slot in said side portion;
(b) having a second shoulder that is adapted to bear against the slot bottom in the side portion of the second longitudinal frame component when the cross-member is located within the slot in said side portion.

14. The method of claim 12 which includes:
(a) providing a shear plate which includes a locating construction;
(b) attaching the shear plate between the first and second longitudinal frame components;
(c) providing a bumper assembly that includes a locating construction that is located, sized and arranged so as to mate with the locating construction of the shear plate;
(d) mating the locating construction of the bumper assembly to the locating construction of the shear plate;
(e) securing the bumper assembly to the first and second longitudinal frame components.

15. The method of claim 12 which includes:
(a) providing a U-shaped shear plate;
(b) attaching the shear plate between the first and second longitudinal frame components.

16. The method of claim 12 which includes:
(a) providing a pair of axle assemblies;
(b) attaching the axle assemblies to the first and second longitudinal members.

17. The method of claim 12:
(a) which includes providing a first longitudinal frame component having a support locating construction that is different from the slot for the cross-member;
(b) which includes providing a first structural support that is different from the cross-member, said first structural support including a locating construction for mating with the support locating construction of the first longitudinal frame component;
wherein the locating construction of the first structural support and the support locating construction of the first longitudinal frame component are located, sized and arranged so that the locating construction of the first structural support may be mated with the support locating construction of the first longitudinal frame component to uniquely position the structural support with respect to the longitudinal frame component;
(c) which includes mating the locating construction of the first structural support to the support locating construction of the first longitudinal frame component;
(d) which includes securing the first structural support to the first longitudinal component.

* * * * *